July 22, 1941.　　　　　E. LAKATOS　　　　　2,249,835

MAGNETOSTRICTIVE VIBRATOR

Filed Nov. 11, 1937　　　3 Sheets-Sheet 1

INVENTOR
E. LAKATOS
BY
E. V. Griggs
ATTORNEY

July 22, 1941.  E. LAKATOS  2,249,835
MAGNETOSTRICTIVE VIBRATOR
Filed Nov. 11, 1937  3 Sheets-Sheet 2
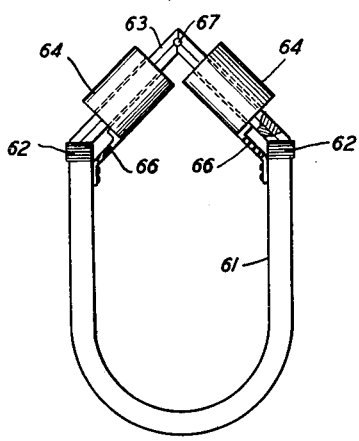
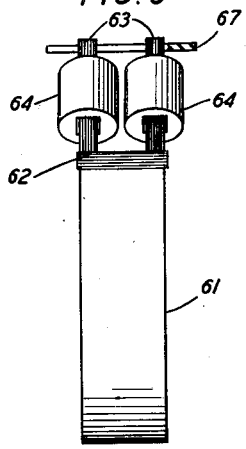
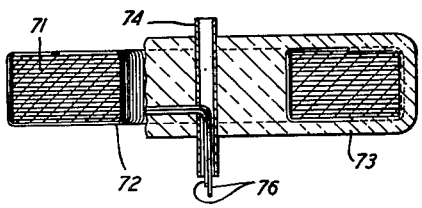
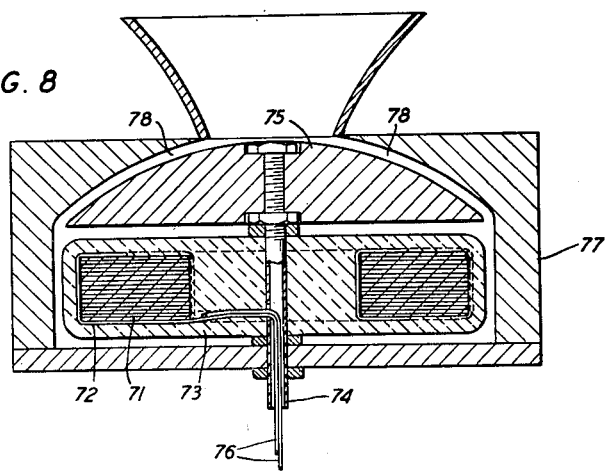
INVENTOR
E. LAKATOS
BY
E. V. Griggs
ATTORNEY July 22, 1941.  E. LAKATOS  2,249,835
MAGNETOSTRICTIVE VIBRATOR
Filed Nov. 11, 1937  3 Sheets-Sheet 3
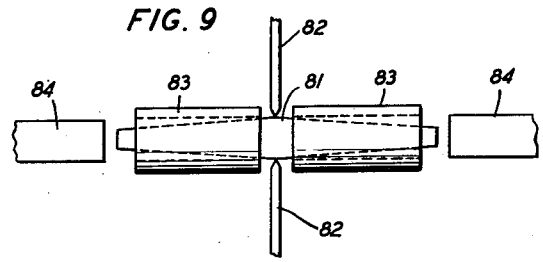
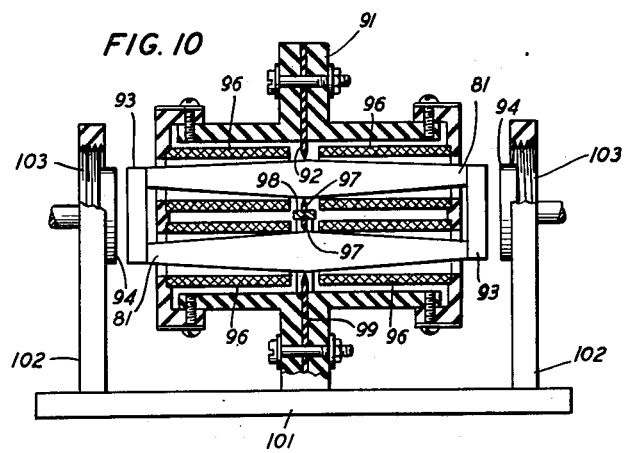
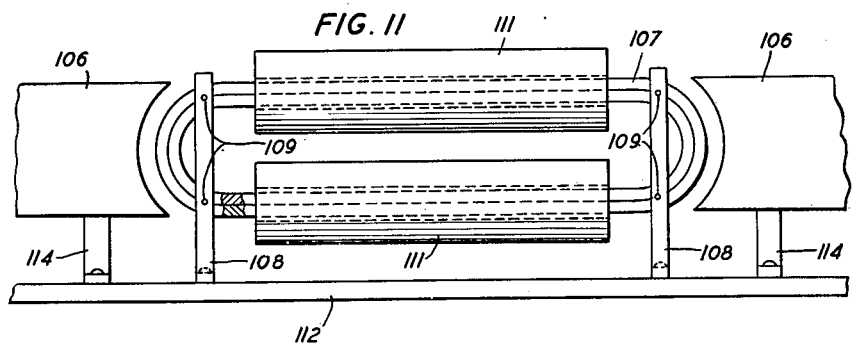
INVENTOR
E. LAKATOS
BY
E. V. Griggs
ATTORNEY Patented July 22, 1941

2,249,835

UNITED STATES PATENT OFFICE 2,249,835

MAGNETOSTRICTIVE VIBRATOR

Emory Lakatos, New York, N. Y., assignor to Bell Telephone Laboratories, Incorporated, New York, N. Y., a corporation of New York Application November 11, 1937, Serial No. 173,969

13 Claims. (Cl. 177—386)

This invention relates to improved electromagnetic vibrators and more particularly to improved apparatus for developing and utilizing effects resulting from the phenomena known as magnetostriction.

Outstanding uses of electromagnetic vibrating devices employing magnetostriction are described in my copending application Serial No. 133,837, filed March 30, 1937, now Patent 2,166,359 dated July 18, 1939, and the copending application of W. P. Mason Serial No. 141,485, filed May 8, 1937, now Patent 2,170,206 dated August 22, 1939.

For efficient mechanical vibration it is an elementary requisite that a vibrating member should be supported at a natural node for the particular mode of vibration desired. By way of example, a straight bar vibrating longitudinally may conveniently be supported at its center, in which case the damping effect of the support upon the vibrational movements can be made negligible. From the standpoint of mechanical efficiency a straight bar suitably supported at its center only, is therefore nearly ideal as a vibrating element.

For efficient coupling between the electrical and mechanical portions of an electromechanical system employing alternating magnetic flux as the coupling medium, it is likewise an elementary principle that the alternating flux threading the electrical circuit should be provided with a completely closed magnetic path of low reluctance. The latter requirement has apparently been overlooked in the design of a number of magnetostrictive devices of the prior art in which the magnetic path has been closed, or nearly closed, by permanently magnetized members having inherently high reluctance.

In the practical design of electromechanical vibrators employing alternating magnetic flux as the coupling medium, of which magnetostrictive vibrators are, of course, a particular variety, the above-mentioned two elementary principles are usually found to result in somewhat conflicting requirements for the system. The closing of the magnetic path is accomplished usually by means which may appreciably damp the mechanical vibration of the vibrating member.

It is therefore a primary object of this invention to provide electromechanical systems employing alternating magnetic flux to couple the electrical and mechanical portions thereof in which efficient coupling is obtained by the provision of a completely closed low reluctance path for the coupling flux without a substantial sacrifice of mechanical efficiency.

A number of forms which such systems may take in particular instances are described hereinafter.

An object of this invention is to provide magnetostrictive vibrators having completely closed low-reluctance magnetic paths for alternating current flux in the vibrating member.

Another object of the invention is to provide more efficient electromagnetic vibrators.

A further object is to provide improved magnetostrictive vibrators for converting electrical energy into mechanical or acoustical energy and vice versa.

A further object is to provide improved bimetallic magnetostrictive vibrators employing flexural vibration.

A further object is to provide means for nodally supporting toroidal vibrators for uniform radial vibration.

A further object is to extend the range of frequencies over which magnetostrictive vibrators may be used to advantage.

Other objects and advantages of the invention will be apparent during the course of the following description.

In the accompanying drawings.

Figure 1:
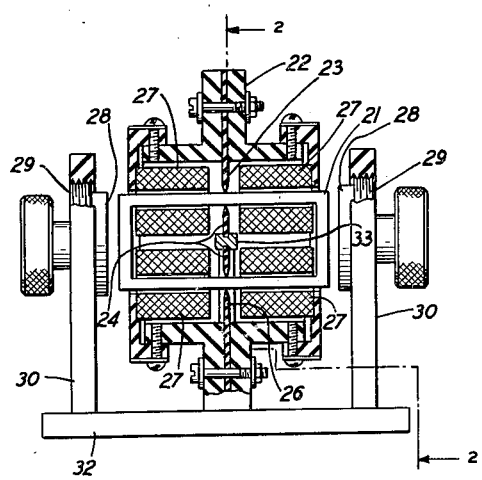
Fig. 1 shows a magnetostrictive vibrator employing a rectangular closed vibrating member supported for longitudinal vibration about nodes centrally located with respect to the longer sides.

Figs. 5 and 6 show an alternative form of vibrator embodying the principles of the vibrator of Fig. 1, except that the magnetostrictive core is of bimetallic construction so that the free apices vibrate laterally and the two halves of the "rectangular" core have been separated and mounted parallel to each other in such manner that the two free apices may be directly coupled to conveniently drive a mechanical load;

Fig. 7 shows a magnetostrictive vibrator employing a toroidal vibrating member embedded in a disc of resilient material and supported for radial vibration about a point centrally located with respect to the circumference of the toroid;

Fig. 8 shows a submarine sound radiator employing a vibrator of the type of Fig. 7;

Fig. 9 shows a vibrating member which is tapered from the central supporting point towards the free ends to obtain a high resonant frequency and increased efficiency of coupling between the electrical and mechanical systems;

Fig. 10 shows a vibrator combining features of the vibrators shown in Figs. 1 and 9; and Fig. 11 shows a vibrator employing an oval bimetallic core nodally supported for flexural vibration.

Figure 2:
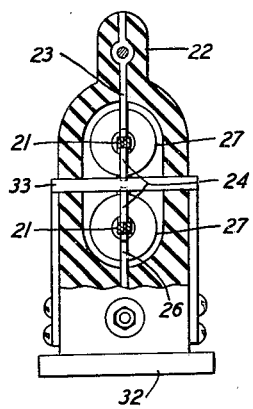
Fig. 2 shows a cross-section of the device of Fig. 1.

In more detail in Figs. 1 and 2 the vibrating element or core 21, as shown, is in the form of a closed rectangle the side members of the rectangle being approximately of square cross-section. It is supported at the center points of the two longer sides by supports 23, 24 and 26. These supports should be adjusted so that they cause no stress tending to deform the core 21. Supports 23 and 26 are carried by standard 22 and supports 24 are carried by standard 33 which in turn is mounted on standard 22.

Core 21 should be constructed in accordance with the principles disclosed in my above-mentioned copending application to eliminate dissipation and the shielding effects of eddy currents. The entire core should be of material having low magnetic reluctance and to avoid the possibility of air-gaps developing, the individual laminations are preferably stamped in one piece, assembled and the coils wound on the assembled core. The longer sides must in addition be highly magnetostrictive, that is, they must change length with changing magnetization so that they may be induced to vibrate longitudinally when subjected to an alternating magnetic flux along their longitudinal axes.

Coils 27 are positioned concentrically with respect to the longer sides of the vibrating element 21 but are supported by standard 22 and have sufficient clearance with element 21 so as to avoid interference with its vibration.

Permanent magnets 28 are cemented to phenol fibre discs 29, the latter being threaded in supports 30 which together with standard 22 are mounted on base 32. The materials and properties suitable for magnets 28 are also given in my above-mentioned copending application.

The characteristics of devices of this invention are analogous in many respects to the devices disclosed in my copending application, the outstanding distinction being that the alternating current flux generated by and/or threading the electrical coils and serving as the coupling medium between the electrical coils and the vibrating elements of the devices is in the case of this invention provided with a completely closed path of low magnetic reluctance while at the same time the vibrating elements are effectively nodally supported for a particular mode of mechanical vibration.

The arrangement increases the coupling between the electrical and mechanical portions of the system resulting in greater efficiency and an extension of the frequency range within which motional impedance effects of useful magnitude may be obtained. A corresponding reduction in coupling with adjacent apparatus is also thereby effected.

The shorter sides or ends of the element 21 in addition to closing the low reluctance path for the alternating flux threading the coils, also act as a small mechanical load, the chief effect of which is to lower the frequency of mechanical resonance which the longer arms vibrating alone would have. For example, in a particular instance where the free longer arms would have vibrated resonantly at 75 kilocycles, when the shorter arms were added to close the rectangle the resonant frequency became 64 kilocycles.

Figure 3:
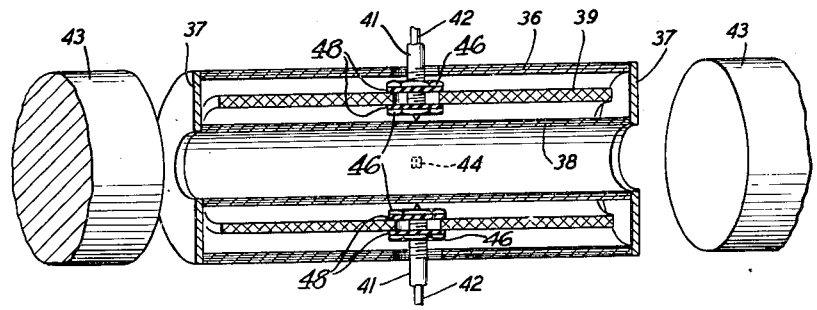
Fig. 3 shows a magnetostrictive vibrator employing a vibrating member completely enclosing the electrical winding between two concentric cylindrical parts joined at their ends by rings, the assembly being supported for longitudinal vibration about nodes centrally located with respect to the concentric cylinders.
Figure 4:
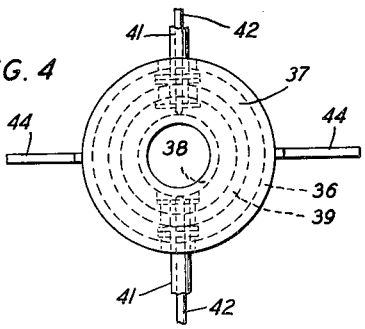
Fig. 4 shows an end view of the device of Fig. 3.

In Figs. 3 and 4 is shown another embodiment of this invention. It comprises two concentric cylinders 36 and 38 shown in longitudinal cross-section in Fig. 3 of low magnetic reluctance, having desirable magnetostrictive properties and joined at their ends by discs 37 the latter having low magnetic reluctance.

The cylinders enclose between them an electrical coil 39 also shown in longitudinal cross-section in Fig. 3. The inner cylinder is held centrally by supports 42 and the outer by supports 44 placed at right angles to the first-stated supports. The coil 39 is held free of the cylinders by supports 41 so as not to interfere with longitudinal vibration of the cylinders about their central points of support. Supports 41 comprise tubes, each being externally threaded at the end as indicated, and each being provided with two nuts 46 and two insulating washers 48, the washers being held firmly against coil 39 by nuts 46 to support coil 39. The internal diameter of support tubes 41 is sufficiently great to clear supporting rods 42 assembled concentrically therewith. Polarizing magnets 43 may be used to polarize the cylinders or this may be accomplished by direct current superimposed upon coil 39.

Figs. 5 and 6 illustrate another form of this invention and comprise two L-shaped vibrating elements 63, the ends of which are joined by bars 62 of a material having low magnetic reluctance. A permanent magnet 61 is provided to polarize elements 63. Elements 63 are of magnetostrictively bimetallic construction arranged, in a manner well known to the art, to vibrate laterally. The relationship between the form of the invention shown in Figs. 5 and 6 and the forms shown in Figs. 1 and 11 will become more apparent if we consider that the two L-shaped vibrating elements 63 of Figs. 5 and 6 could be joined directly in a common plane to form a rectangular core, two diagonally opposite apices being fixed and the remaining two being free to vibrate laterally, steady magnetic polarization being provided by a permanent magnet bridging the fixed apices. The auxiliary pieces 62 could then be dispensed with but it would be somewhat less convenient to couple the pair of free apices to drive a mechanical load. For the latter reason the structure shown in Figs. 5 and 6 is suggested to illustrate this embodiment of the invention. This invention contemplates that in addition to being of the usual magnetostrictive bimetallic construction, that is, one-half of the member being made of a material having the opposite sign as to its magnetostrictive response to that of the other half of the member, the halves of each member may each be constructed in accordance with the principles of my above-mentioned copending application to eliminate dissipation and the shielding effects of eddy currents.

The ends of each L-shaped element being fixed, lateral movement occurs at the apex. Electrical coils 64 are concentric with the portions of the elements 63 on which they are situated but are held by supports 66 and have sufficient clearance with elements 63 so that they do not interfere with the vibration of the latter. The coils 64 are connected electrically in series aiding, that is, when carrying current they send flux around the closed magnetic path formed by elements 63 and bars 62 in the same direction.

To obtain lateral apex motions of the two elements 63 in phase, sides having like metals must be placed adjacent since for a given instant the alternating current flux in one element will be aiding the polarizing flux and in the other element it will be opposing the polarizing flux. The apices of the two elements 63 may then be joined by a rod of non-magnetic material 67 which may be employed to drive a mechanical load such, for example, as a loud-speaker diaphragm.

A further embodiment of this invention is shown in Fig. 7 and comprises a toroidal core 71, shown in cross-section, carrying a winding 72, the assembly being embedded in a disc of insulating material 73 shown in cross-section and partly broken away at the left of the figure to show the winding on the core, the disc being provided with a centrally located support 74. Leads 76 to the winding 72 are brought out centrally.

The material of disc 73 should have a resilience comparable to that of the core 71 so that the core may vibrate radially, in which mode of vibration the center support 74 will be located at a node. A number of common ceramic materials have been found suitable for this use including porcelain clay, titanium oxide or isolantite. A convenient method of making such a toroidal vibrator is to coat the toroid core with ceramic material, wind a layer of bare copper wire thereover, embed the assembly in a disc of ceramic material and heat until the ceramic material has acquired the desired characteristics.

Fig. 8 shows the vibrator of Fig. 7 employed in a device peculiarly well adapted for use as a submarine sound radiator. The vibrator of Fig. 7 is shown mounted in the throat of a horn 77. The throat of the horn 77 and a throat piece 75 are so shaped that paths of equal length 78 and suitable cross-sectional area are provided from all points on the periphery of the toroidal vibrator 73 to the base of the orifice in horn 77. Energy from all points on the periphery of vibrator 73 therefore arrives at the orifice in phase. By suitably shaping the orifice of horn 77 sharp or broad directional properties may be imparted to the sound transmitted. In such devices it is usually convenient to polarize the magnetostrictive core by superimposing direct current upon the winding carrying the alternating current, though obviously a separate polarizing winding may be provided if deemed preferable. As explained in my above-mentioned copending application, the characteristics of magnetostrictive electromechanical vibrators are profoundly affected by the degree of polarization and this should be adjusted and maintained within suitable limits to insure the performance desired in any particular instance.

Fig. 9 shows an improved type of vibrating element 81 centrally supported by supports 82 polarized by permanent magnets 84 and with electrical coils 83 electromagnetically coupled thereto but mechanically free therefrom. This particular form of vibrating element has been found to afford a greater degree of coupling between the electrical coils and the magnetostrictive element than an element of uniform cross-sectional area in magnetostrictive devices designed for operation at the upper end of the frequency range, roughly around 100 kilocycles, in which the use of such devices is at present considered feasible.

This presumably results from the fact that closer coupling exists between the coil and the portion of the element centrally located within the coil where very little flux leakage takes place as compared to the coupling between the coil and material nearer the free ends of the coil. Hence the material near the ends contributes principally a loading effect to the vibrating element which merely reduces the resonant frequency of the element without adding appreciably to the coupling. The use of such vibrating elements will extend the useful frequency range of magnetostrictive devices.

Fig. 10 illustrates the application of the principle of shaping the vibrating element as disclosed in connection with Fig. 9 to the present invention and results in a device similar to that of Fig. 1. In Fig. 10 the vibrating element, consisting of bars 81 and 93, is in the form of a closed rectangle, the longer sides 81 being tapered from their centers as is the element of Fig. 9. The shorter sides or end pieces 93 are of uniform cross-sectional area equal to the area of the ends of bars 81. The construction, adjustment and operation of the device of Fig. 10 is in other respects the same as that of Fig. 1 and the parts of Fig. 10, namely, the standard 91, supports 92, 97 and 99, the coils 96, the permanent magnets 94, threaded phenol fibre discs 103, supports 102 and base 101 have functions identical to those of the corresponding details of the device of Fig. 1.

Fig. 11 shows a further embodiment of this invention and comprises a vibrating element 107 having the form suggested in United States Patent 1,963,719, issued June 19, 1934 to S. A. Schelkunoff. Supports 108 hold vibrating element 107 at its nodes 109. Vibrating element 107 is of magnetostrictively bimetallic construction as described above in connection with Figs. 5 and 6, so that it vibrates laterally. Coils 111 are concentric with but mechanically free of the sections of the element 107 they encircle, sufficient clearance to permit vibration of the element being provided. Permanent magnets held on supports 114 may be adjusted to provide the required degree of polarization. If it is desired to employ a vibrator of this type to drive a loud-speaker diaphragm, or to convert mechanical energy into electrical energy, coils 111 may obviously be wound in two parts, the parts being separated sufficiently at the center to permit the transfer of mechanical energy to or from the core by any of the numerous methods well known to the art.

Many other applications and modifications within the spirit and scope of the invention will occur to persons skilled in the art and no effort has here been made to be exhaustive.

What is claimed is:

1. A magnetostrictive vibrator comprising an electrical coil, a vibrating member of magnetostrictive material electromagnetically coupled with said coil, said vibrating member forming a closed path of low reluctance for the magnetic flux threading said coil, and means for nodally supporting said vibrating member to permit efficient mechanical vibration in a particular mode.

2. A magnetostrictive vibrator comprising an electrical coil, a core partly of magnetostrictive material forming a completely closed low-reluctance path for the alternating magnetic flux threading said coil, means for polarizing said magnetostrictive material to a predetermined degree, and means for nodally supporting said core for mechanical vibrations of a particular mode.

3. A magnetostrictive device comprising an electrical coil electromagnetically coupled with a low reluctance, magnetostrictive core, said core forming a completely closed magnetic path for the flux threading said coil, and means for nodally supporting said core so that the major portions thereof vibrate longitudinally by magnetostrictive action when stimulated by the passage of alternating current through the electrical coil.

4. A compound magnetostrictive vibrator comprising two identical vibrating members of magnetostrictive material each of said members being supported at its mid-point, two electrical coils, each of said electrical coils being mechanically independent of but electromagnetically coupled to one of said vibrating members respectively, said two vibrating members and associated electrical coils being placed parallel and adjacent in the same plane, the corresponding ends of said vibrating members being connected by bridging members of low-reluctance magnetic material forming with the vibrating members a low-reluctance, completely closed magnetic path for the flux of said coils, said coils being connected in series aiding.

5. A compound magnetostrictive vibrator as defined in claim 4 and adjustable external means for polarizing said vibrating member.

6. A submarine radiator including a torodial magnetostrictive vibrating element, an electrical coil wound thereon, said element carrying said coil having been embedded and baked in a disc of insulating material having resilient properties comparable to said element, and means for supporting said disc centrally to permit uniformly free radial vibrations of said magnetostrictive element.

7. A magnetostrictive vibrator comprising a torodial core of magnetostrictive material, an electrical coil disposed uniformly thereon, a disc of ceramic material into which said core has been embedded and baked, and means for supporting said disc centrally whereby the assembly may vibrate radially with a uniform degree of freedom in every direction when said magnetostrictive core is stimulated by the passage of alternating current through said coil.

8. An electromechanical vibrator including a toroidal magnetostrictive core embedded in a disc of non-magnetic electrically non-conducting material, said material having resilience comparable to that of the material of the core and means for supporting said disc centrally.

9. A magnetostrictive vibrator as defined in claim 4, each of the said two vibrating members being tapered from its mid-point toward both ends.

10. A magnetostrictive vibrator as defined in claim 4, each of the said two vibrating members being tapered from its mid-point toward both ends, said vibrator including a pair of permanently magnetized polarizing members and means for accurately adjusting and maintaining the position of said polarizing members with respect to the vibrating members.

11. A magnetostrictive vibrator comprising an electrical coil enclosed between two cylindroidal elements of magnetostrictive material, the ends of said elements being joined by plates having low reluctance to alternating magnetic flux, said elements and said plates forming a completely closed low reluctance path for the alternating flux of said coil, nodal supports for each of said elements for longitudinal vibration about the transverse central plane thereof and supports for said coil, said last stated supports maintaining said coil physically out of contact with the mechanical vibrating system of said vibrator.

12. A magnetostrictive vibrator as defined in claim 11, and a pair of polarizing magnets, one of said polarizing magnets being placed at each end of the vibrating system.

13. A magnetostrictive vibrator as defined in claim 2, the said electrical coil covering a part only of said core, the part of said core covered by said coil being tapered from its center towards the ends thereof whereby the coupling between said coil and said core is increased and the resonant frequency of said core is raised.

EMORY LAKATOS.